(12) United States Patent
Ishimasa

(10) Patent No.: US 8,905,656 B2
(45) Date of Patent: Dec. 9, 2014

(54) LENS BARREL AND CAMERA INCLUDING LENS BARREL

(75) Inventor: Toru Ishimasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 13/348,120

(22) Filed: Jan. 11, 2012

(65) Prior Publication Data

US 2012/0183286 A1     Jul. 19, 2012

(30) Foreign Application Priority Data

Jan. 17, 2011   (JP) ................................ 2011-007051

(51) Int. Cl.
| | | |
|---|---|---|
| *G03B 9/02* | (2006.01) | |
| *G03B 17/04* | (2006.01) | |
| *G03B 9/22* | (2006.01) | |
| *G03B 17/14* | (2006.01) | |

(52) U.S. Cl.
CPC ................ *G03B 17/14* (2013.01); *G03B 17/04* (2013.01); *G03B 9/22* (2013.01)
USPC ........................................................ 396/510

(58) Field of Classification Search
CPC .............. G03B 9/02; G03B 9/06; G03B 9/10; G03B 9/14; G03B 9/18; G03B 9/22
USPC ........................................................ 396/510
See application file for complete search history.

(56) References Cited

U.S. PATENT DOCUMENTS

| | | | | |
|---|---|---|---|---|
| 2009/0147127 | A1* | 6/2009 | Ogawa et al. | ................. 348/374 |
| 2010/0027986 | A1* | 2/2010 | Katano | ......................... 396/448 |
| 2010/0226642 | A1* | 9/2010 | Hirabayashi | .................. 396/448 |

FOREIGN PATENT DOCUMENTS

| | | | | |
|---|---|---|---|---|
| CN | 1289068 | A | 3/2001 | |
| JP | 2004-046242 | A | 2/2004 | |
| JP | 2004246023 | A * | 9/2004 | ............. G03B 11/04 |
| JP | 2005-215081 | A | 8/2005 | |
| JP | 2005-215082 | A | 8/2005 | |
| JP | 2007-102086 | A | 4/2007 | |
| JP | 2010-008830 | A | 1/2010 | |
| JP | 2010-186173 | A | 8/2010 | |
| JP | 2010-191062 | A | 9/2010 | |
| JP | 2011-008140 | A | 1/2011 | |

* cited by examiner

*Primary Examiner* — Clayton E LaBalle
*Assistant Examiner* — Fang-Chi Chang
(74) *Attorney, Agent, or Firm* — Canon USA Inc IP Division

(57) ABSTRACT

A lens barrel includes a lens tube configured to hold a lens, a barrier driving member configured to move between an opened state and a closed state by switching of the lens tube between a shooting-ready state and a retracted state, a pair of first barrier blades, each of which includes a blade portion, configured to open and close in conjunction with the barrier driving member, and a pair of second barrier blades, each of which includes a blade portion and a coupling portion, the coupling portion positioned outside the lens as viewed from an object side and located closer to the first barrier blade than the blade portion, the pair of second barrier blades being configured to be moved by contact between the coupling portion and the first barrier blade.

16 Claims, 13 Drawing Sheets

LENS BARREL AND CAMERA INCLUDING LENS BARREL

BACKGROUND OF THE INVENTION

1. Field of the Invention

The present invention relates to a lens barrel which includes barrier blades configured to open and close a front surface of a photographic lens, mounted on an imaging apparatus such as a camera, to protect the photographic lens.

2. Description of the Related Art

In a retractable-lens camera, which compactly retracts a lens barrel when the camera is carried and extends the lens barrel to move a photographic lens to an appropriate position when the camera is used, various lens barrel mechanisms have been proposed in which barrier blades cover the front surface of the lens when the lens barrel is in its retracted position and the barrier blades are retracted from the front surface of the lens when the camera is in use.

In such a barrier mechanism, the number of barrier blades which constitute the barrier can be selected depending on the effective optical path range of an optical system and the diameter of a lens barrel to effectively cover the front surface of a lens.

This is because there is a limitation on the dimension of the blade which can be stored in a blade storage portion defined by the difference between the diameter of the lens barrel and the effective optical path range of the optical system. Accordingly, with regard to the lens barrels with the same diameter, a larger number of barrier blades are needed as the effective optical path range of the optical system becomes larger.

Accordingly, it is general that a pair of barrier blades is provided to have a bilateral point symmetric relation and each barrier blade covers half of the effective optical path range of the optical system.

However, users tend to demand a zoom lens with a high magnification and a short focal length at the wide-angle end. Thus, the effective optical path range of the front surface of the lens and the optical path range in a space occupied by the barrier in the optical axis direction are considerably widened.

Even though the number of blades constituting the barrier increases to satisfy that demand, the barrier may be thickened in the optical axis direction due to the increase in number of blades. Then, in the space in the optical axis direction, the effective optical path is widened, and the blade storage portion may be narrowed. As a result, the effect of increasing the number of blades may be reduced, so that the space for the barrier in the optical axis direction may be extremely thickened.

Therefore, as a barrier for a lens of a wide-angle system having a short focal length, Japanese Patent Application Laid-Open No. 2007-102086 discusses a technique that decreases the thickness and the size of the barrier.

In the technique discussed in Japanese Patent Application Laid-Open No. 2007-102086, a blade having the largest amount of movement is disposed to be closest to the photographic lens and a second blade is provided with a pair of transmission portions to be pushed by the blade having the largest amount of movement at both its closed and opened sides.

Further, a third blade is provided with a pair of transmission portions to be pushed by the second blade at both its closed and opened sides.

Furthermore, the blade having the largest amount of movement and the third blade are each formed of a metallic sheet to be thin in thickness.

Furthermore, as the transmission portion, the blade having the largest amount of movement is provided with an upward bent portion which is bent in the direction opposite to the lens along the optical axis direction. Further, the third blade is provided with an upward bent portion which is bent toward the lens (the direction toward the imaging plane) along the optical axis direction. Then, since the transmission portion is formed by the upward bent portion, the second blade is formed as a component which is molded from plastic and is formed to be slightly thick.

This is because the upward bent portion, which is bent toward the lens (the direction toward the imaging plane) along the optical axis direction, is provided in either the blade having the largest amount of movement or the second blade. Thus, since there is concern that the lens may be scratched when the upward bent portion passes on the lens, the upward bent portion is not provided in the range overlapping the front lens surface as viewed on the projection plane.

For this reason, in the technique discussed in Japanese Patent Application Laid-Open No. 2007-102086, the second blade is molded from plastic.

SUMMARY OF THE INVENTION

According to an aspect of the invention, a lens barrel includes a lens tube configured to hold a lens, a barrier driving member configured to move between an opened state and a closed state by switching of the lens tube between a shooting-ready state and a retracted state, a pair of first barrier blades, each of which includes a blade portion, configured to open and close in conjunction with the barrier driving member, and a pair of second barrier blades, each of which includes a blade portion and a coupling portion, the coupling portion positioned outside the lens as viewed from an object side and located closer to the first barrier blade than the blade portion, the pair of second barrier blades being configured to be moved by contact between the coupling portion and the first barrier blade.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Referring to FIGS. 1, 2, 3, and 4, a barrier mechanism which is incorporated in a camera according to an exemplary embodiment of the invention will be schematically described.

Figure 1:
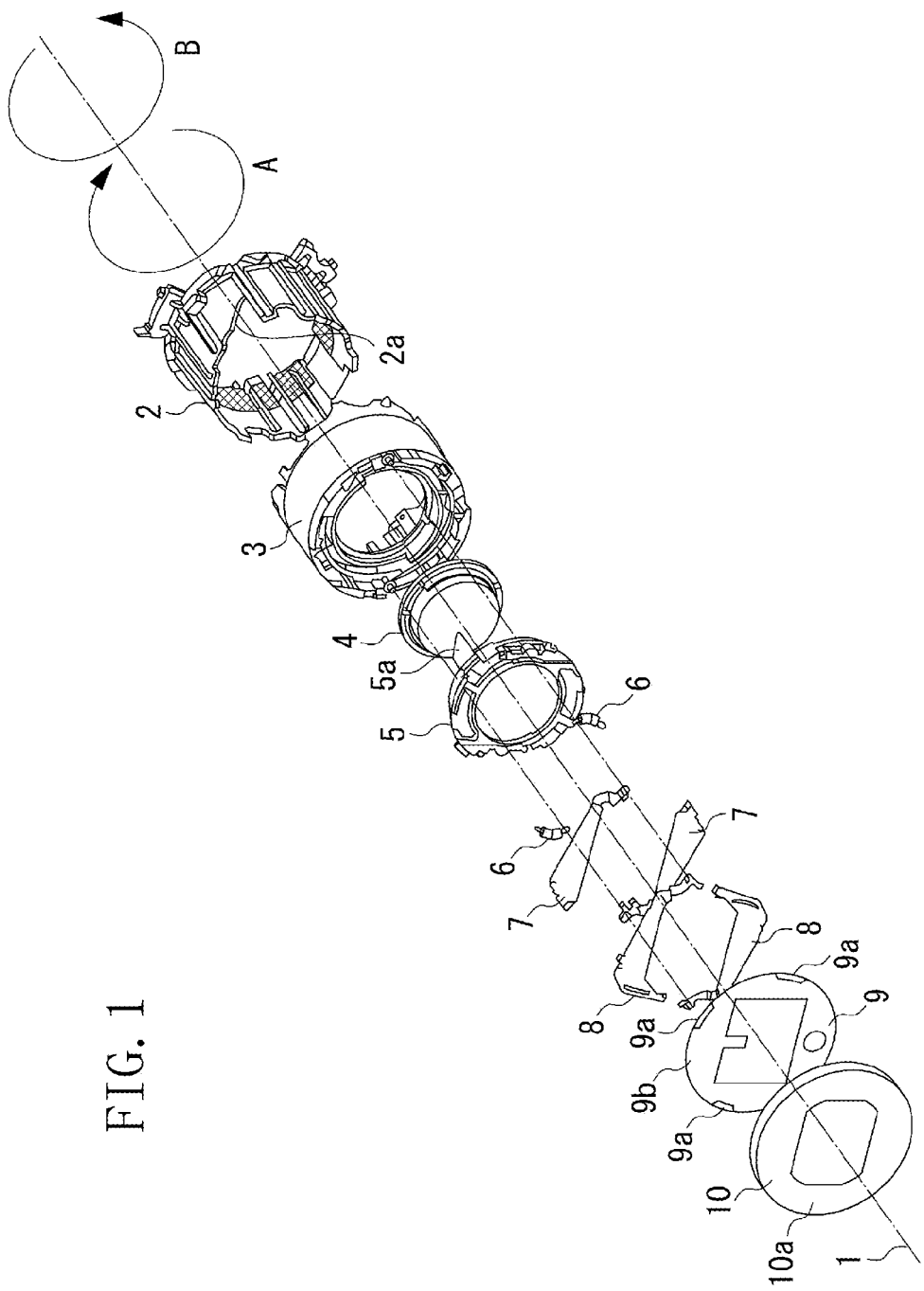
FIG. 1 is an exploded perspective view illustrating a barrier mechanism according to an exemplary embodiment of the invention.
Figure 2:
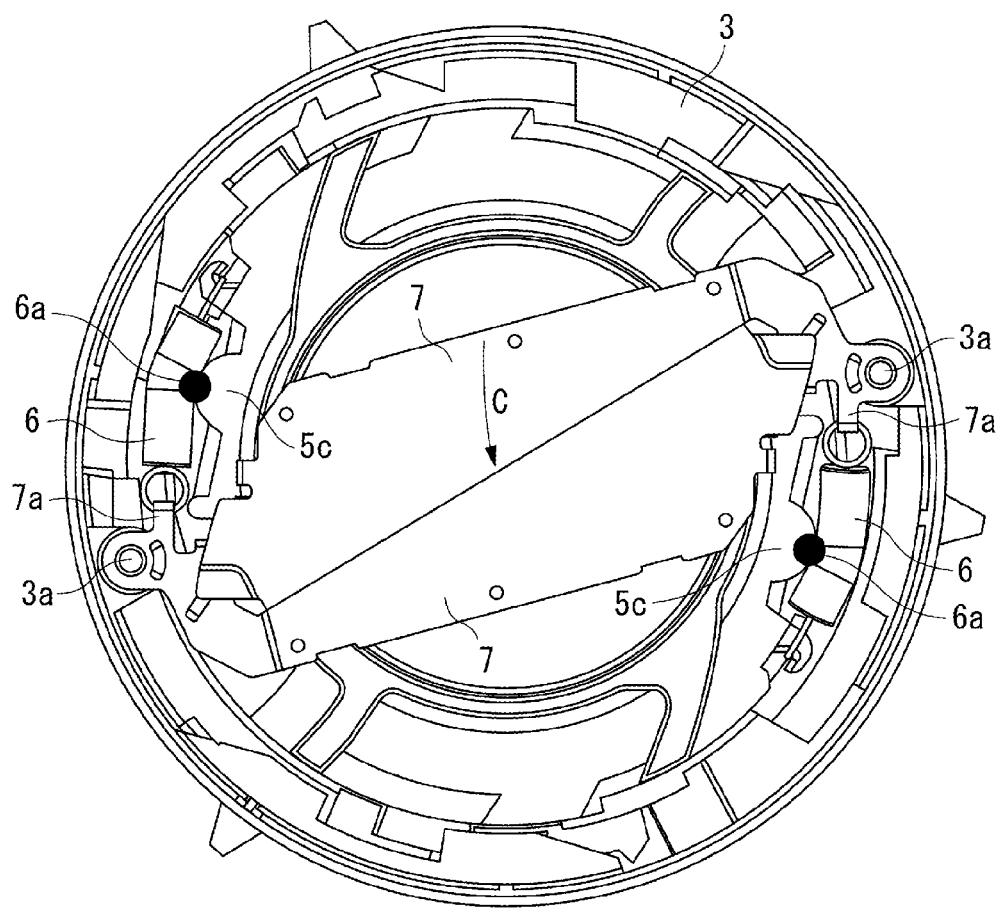
FIG. 2 is a front view illustrating a state where a barrier is fully closed.
Figure 3:
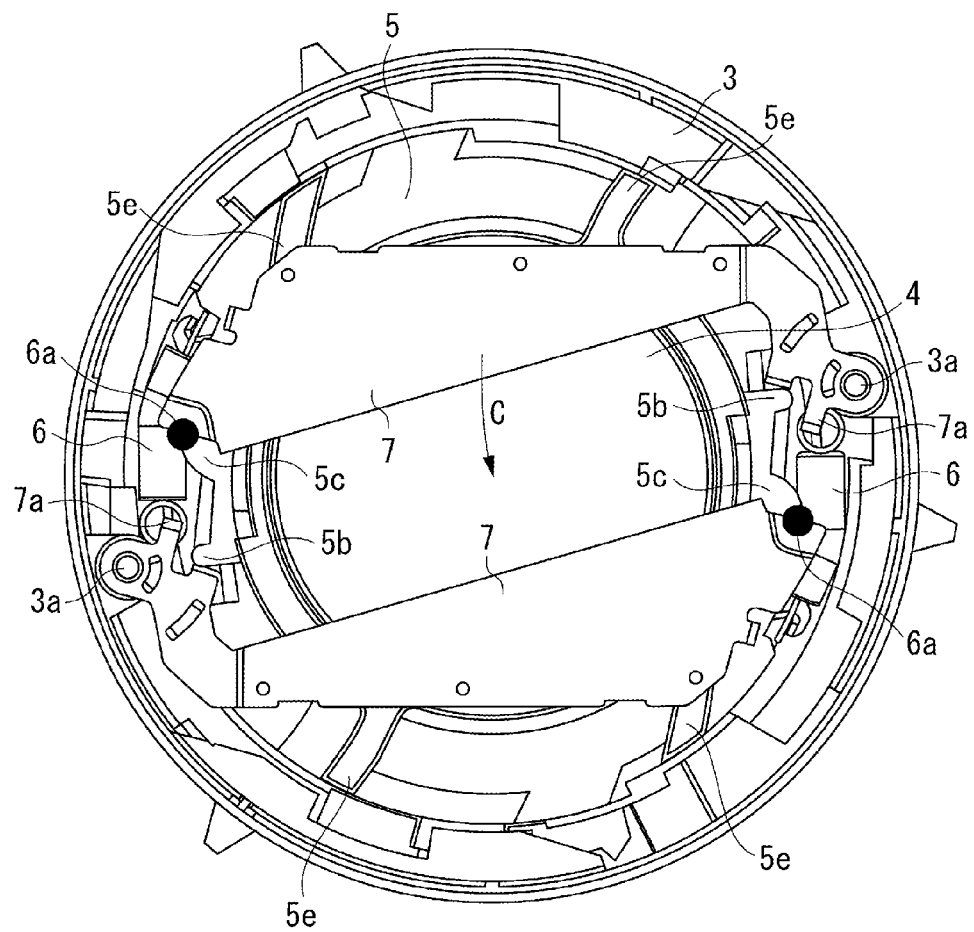
FIG. 3 is a front view illustrating a state where the barrier starts to be opened.
Figure 4:
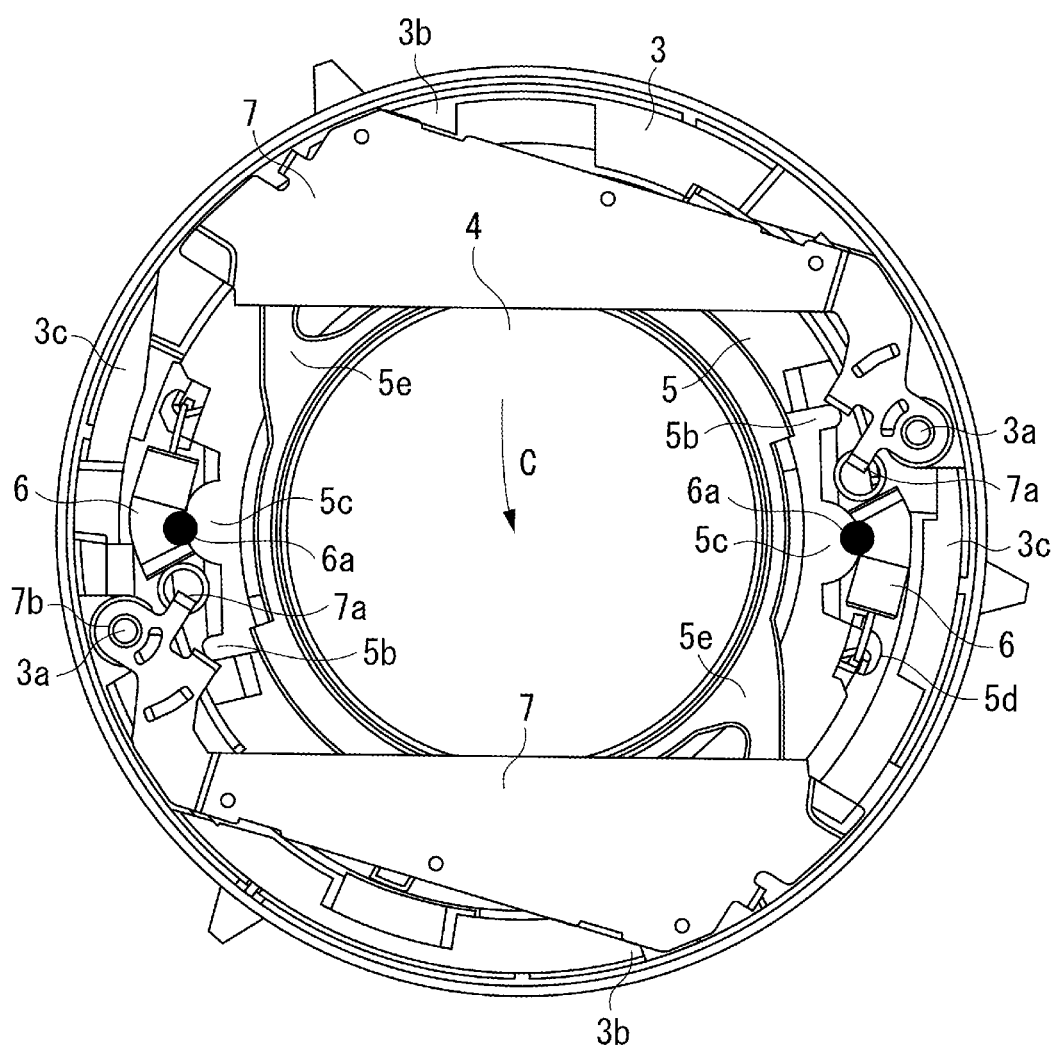
FIG. 4 is a front view illustrating a state where the barrier is fully opened.
Figure 5:
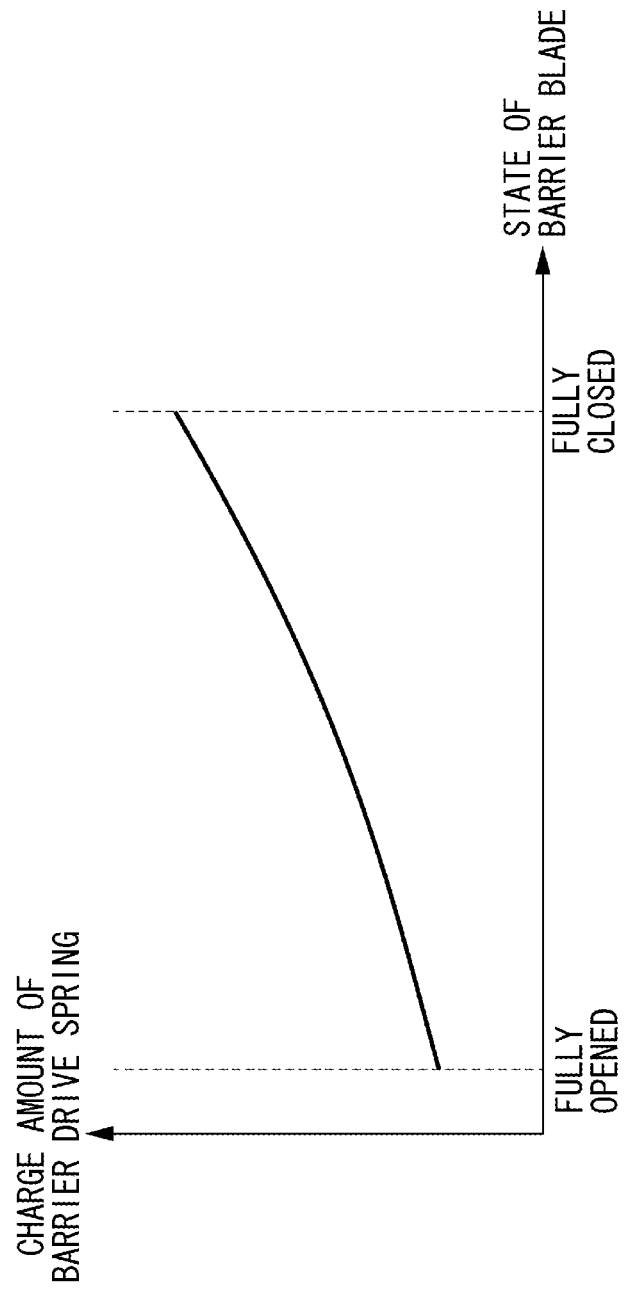
FIG. 5 is a diagram illustrating a change in charge amount of a barrier drive spring.

FIG. 1 is an exploded perspective view illustrating a barrier mechanism according to an exemplary embodiment of the invention. FIG. 2 is a front view illustrating a state where a barrier is fully closed, FIG. 3 is a front view illustrating a state where the barrier starts to be opened, and FIG. 4 is a front view illustrating a state where the barrier is opened. A lens tube 3 includes a barrier mechanism and is positioned at the front end of the lens barrel when the lens tube 3 switches from a retracted state to a shooting-ready state. The lens tube 3 is configured to switch between the shooting-ready state and the retracted state, and FIG. 4 illustrates the state of the barrier when the lens tube 3 is positioned at the shooting-ready state. The barrier mechanism is mounted at the front end of the lens tube 3. A photographic lens 4 is one of a lens group which constitutes a zoom lens, and is a lens which is positioned at the foremost side. An image sensor (not illustrated) is disposed at the rear side of the lens group which constitutes the zoom lens. The lens tube 3 holds the photographic lens 4, and is configured to be retracted and moved forward along the optical axis direction 1 together with the photographic lens 4. The lens tube 3 is provided with rotation shafts 3a, which are formed as rotation shafts of barrier blades 7 and 8 constituting the barrier mechanism, and a stopper 3b, which regulates the rotation of the barrier blade 7 in the opening direction via the barrier blade 8. The stopper 3b is also used as a sticking spot for a barrier cover fixing member 9, which is formed of a double-sided adhesive tape for fixing a barrier cover 10 to the lens tube 3.

The lens tube 3 is provided with a sticking spot 3c which is used for the barrier cover fixing member 9 and does not serve as the stopper. In the barrier cover fixing member 9 illustrated in FIG. 1, after adhesive layers 9a and 9a are attached to the lens tube 3, amount portion 9b is removed while the adhesive layers 9a is left. The mount 9b is used so that the sticking workability is satisfactorily performed and the position of the adhesive layer 9a is accurately maintained.

A rectilinear motion tube 2, which regulates the rotation of the lens tube 3, is disposed inside the lens tube 3. According to the switching operation between the retracted state and the shooting-ready state of the lens tube 3, the lens tube 3 relatively moves in the optical axis direction 1 with respect to the rectilinear motion tube 2. In the shooting-ready state, the lens tube 3 is moved forward relative to the rectilinear motion tube 2, so that the distance therebetween is widened. In the retracted state, the lens tube 3 is moved backward relative to the rectilinear motion tube 2, so that the distance therebetween is narrowed.

The rectilinear motion tube 2 is provided with a cam surface 2a, which is configured to close the barrier. The front end of the lens tube 3 is provided with barrier blades 7 and 8, which are journaled to be rotatable, a barrier driving member 5, which drives the barrier blades 7 and 8, and a barrier cover 10, in which a photographic opening 10a is formed. When the lens tube 3 is in the retracted state, the barrier blades 7 and 8 cover the photographic opening 10a to protect the photographic lens 4.

The barrier cover 10 is bonded and fixed to the lens tube 3 by the barrier cover fixing member 9. The barrier driving member 5 is supported by the lens tube 3 to be relatively rotatable around the optical axis.

The barrier driving member 5 is provided with a cam surface 5a, which is configured to be pushed by the cam surface 2a of the rectilinear motion tube 2 to close the barrier. The barrier driving member 5 is provided with rails 5e, which allow the barrier blade 7 to rotate so that the rear surface of the barrier blade 7 does not come into contact with the photographic lens 4. The barrier driving member 5 is provided with a spring hanger 5d, which extends in the radial direction.

Since the arm of the spring hanger 5d extends in the radial direction, the position of the barrier driving member 5 in the optical axis direction can be stably managed. One end of a barrier drive spring 6 is put on the spring hanger 5d. The spring hanger 5d is located at a position slightly lower than a spring hanger provided in the barrier blade 7 so that the barrier drive spring 6 is slightly obliquely hanged. In a case where a barrier opening spring is used between the barrier driving member 5 and the lens tube 3, the barrier drive spring 6 is used as a blade closing spring. In this case, the barrier drive spring 6 may be provided between the lens tube 3 and the barrier blade 7 in the direction to close the barrier blades 7 and 8.

In a case where an abnormal operation caused by foreign substances interposed between the blades is absorbed by a portion other than the barrier driving member 5 and the barrier blade 7, the barrier driving member 5 and the barrier blade 7 may be coupled to each other by a gear coupling type or a direct coupling type without using an absorbing mechanism such as a shaft and an elongated hole.

The barrier blade 7 is a blade which is disposed closest to the photographic lens 4 and has the largest amount of movement, and is formed from a metallic thin sheet.

Figure 6:
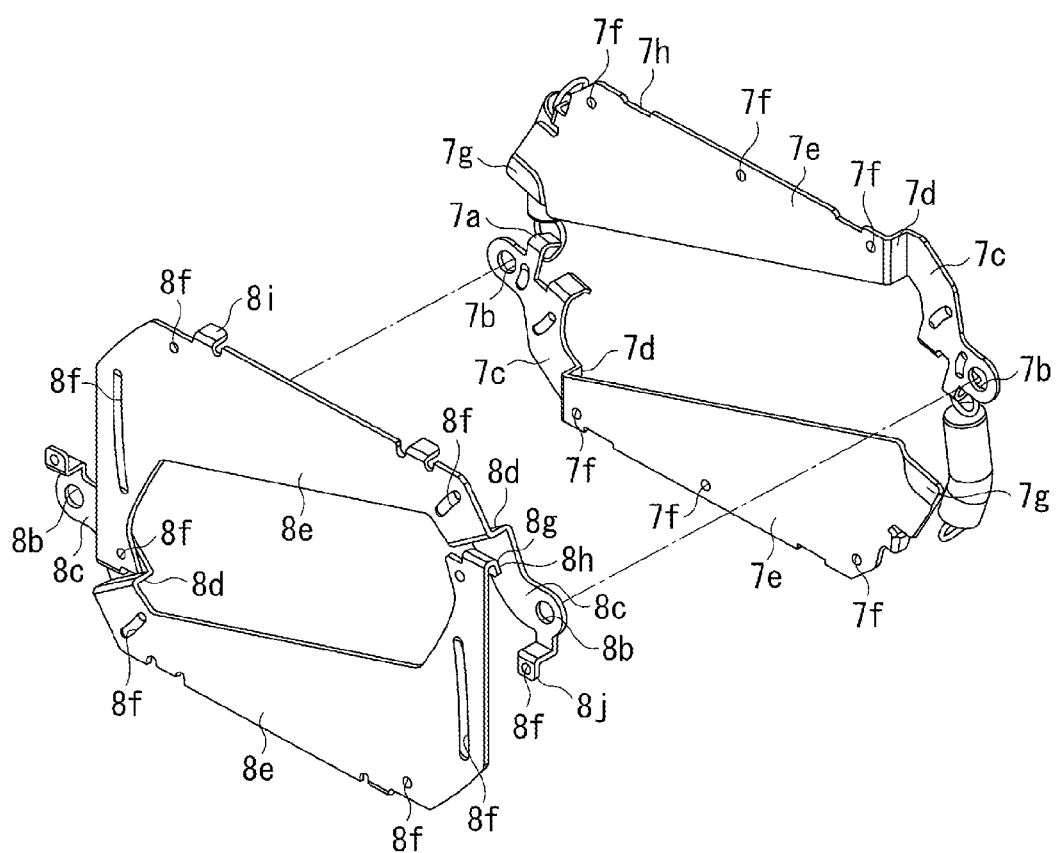
FIG. 6 is a specific diagram illustrating a barrier blade.

The barrier blades 7 and 8 are specifically illustrated in FIG. 6. A pair of barrier blades 7 is each provided with a planar support portion 7c, which has a rotation hole 7b used to attach the barrier blade 7 to the rotation shaft 3a of the lens tube 3. The support portion 7c is a portion rotating outside the outer shape of the photographic lens 4 and is located at a position overlapping the photographic lens 4 as viewed from the side. The barrier blade 7 is further provided with a step portion 7d, which is bent upright in the direction perpendicular to the support portion 7c. The step portion 7d is also a portion rotating outside the outer shape of the photographic lens 4.

The step portion 7d is connected with a blade portion 7e, which rotates in the area including the front side of the photographic lens 4. The blade portion 7e is a plane which is parallel to the support portion 7c. Since the step portion 7d is provided, the rotation hole 7b of the support portion 7c can enter the inside of the rotation shaft 3a of the lens tube 3 without increasing the thickness in the optical axis direction. Thus, even when the barrier cover 10 is floated due to an impact or the like and the barrier blade 7 is slightly floated in the separation direction, an accident in which the barrier blade 7 drops out of the shaft does not easily occur.

The rear surface of the blade portion 7e slides on the rail 5e, which is provided in the barrier driving member 5. Since the rear surface slides on the rail 5e, the rear surface of the blade portion 7e of the barrier blade 7 can rotate in such a way as not to come into contact with the photographic lens 4.

The blade portion 7e is provided with sliding portions 7f and 7g, which maintain a gap with respect to the barrier blade 8. The sliding portion 7g serves as a closing driving portion for the front end of the barrier blade 7. The sliding portion 7g, which serves as the closing driving portion, is located at the side opposite the rotation hole 7b across the photographic lens 4 and at a position not overlapping the photographic lens 4 as viewed on the projection plane. Thus, the sliding portion 7g is located at a position overlapping the photographic lens 4 in the optical axis direction. The sliding portion 7g, which serves as the closing driving portion, drives the barrier blade 8 in the closing direction by pushing a part of the barrier blade 8 when the barrier blade 7 performs a closing operation.

Furthermore, the barrier blade 7 is provided with an opening driving portion 7h, which drives the barrier blade 8 in the opening direction by pushing a part of the barrier blade 8. The opening driving portion 7h is a part of the edge of the blade portion 7e.

A bent portion of the hook 7a protrudes from a part of the support portion 7c. The hook 7a is a hook which is used for the attachment of the barrier drive spring 6. The hook 7a is bent by an angle larger than the right angle and is formed so that the attachment portion of the barrier drive spring 6 tightly and stably contacts the rear surface of the support portion 7c.

Referring back to FIG. 1, a tension coil spring is provided as the barrier drive spring 6 between the barrier blade 7 and the barrier driving member 5. The barrier drive spring 6 is biased in the direction where the barrier blade 7 comes into contact with the barrier driving member 5, so that the rotation of the barrier driving member 5 is interlocked with the opening and closing operation of the barrier blade 7.

Barrier blade 8, which is a second blade, is located on the barrier blade 7. The barrier blade 8 is provided with a pair of transmission portions provided at both its closed and opened sides to be pushed by the barrier blade 7. Thus, when the barrier blade 7 is closed, the barrier blade 8 is also closed. When the barrier blade 7 is opened, the barrier blade 8 is also opened. Furthermore, the barrier blade 8 is also formed of a metallic thin sheet like the barrier blade 7.

Referring to FIG. 6 again, the barrier blade 8 will be specifically described. A pair of barrier blades 8 is each provided with a planar support portion 8c, which has a rotation hole 8b used to attach the barrier blade 8 to the rotation shaft 3a of the lens tube 3.

The support portion 8c is a portion rotating outside the outer shape of the photographic lens 4 and is located at a position overlapping the photographic lens 4 as viewed from the side. The barrier blade 8 is further provided with a step portion 8d, which is bent upright in the direction perpendicular to the support portion 8c. The step portion 8d also rotates outside the outer shape of the photographic lens 4.

The step portion 8d is connected with a blade portion 8e, which rotates in the area including the front side of the photographic lens 4. The blade portion 8e is a plane which is parallel to the support portion 8c. The rear surface of the blade portion 8e slides on the sliding portion 7f, which is provided in the barrier blade 7, and the sliding portion 7g, which serves as the closing driving portion. Due to the sliding action on the sliding portion 7g, the rear surface of the blade portion 8e of the barrier blade 8 rotates in such a way as not to come into contact with the blade portion 7e of the barrier blade 7, so that any scratch is not formed thereon.

The blade portion 8e is provided with a sliding portion 8f, which maintains a gap with respect to the barrier cover 10. Further, in the front end of the barrier blade 8, a closing coupling portion 8g, which receives a closing driving force, is located outside the photographic lens 4 as viewed from an object side (the side of an object to be photographed). The closing coupling portion 8g is located at a position which is bent from the blade portion 8e toward the barrier blade 7. The closing coupling portion 8g is folded back by an angle equal to or greater than 90° and less than 180°. A retaining portion 8h is formed to be continued from the closing coupling portion 8g. The closing coupling portion 8g is a plane portion with which the sliding portion 7g serving as the closing driving portion comes into contact. The retaining portion 8h is located at a position which is further bent from the closing coupling portion 8g. The retaining portion 8h is bent in a V-shape from the blade portion 8e. The closing coupling portion 8g, the retaining portion 8h, and the blade portion 8e form a V-shape, so that the sliding portion 7g serving as the closing driving portion is retained and the barrier blade 7 is not flapped. Accordingly, when the barrier blade 8 is at the closed position, the front end of the barrier blade 7 can be prevented from swaying in the optical axis direction. The closing coupling portion 8g and the retaining portion 8h are located at a position not overlapping the photographic lens 4 as viewed on the projection plane, and are disposed opposite the rotation hole 8b across the photographic lens 4. When the barrier is in the closed state, the closing coupling portion 8g and the retaining portion 8 overlap the support portion 8c of the other paired barrier blade 8 as viewed on the projection plane.

The sliding portion 7g, which serves as the closing driving portion, pushes the closing coupling portion 8g of the barrier blade 8 to drive the barrier blade 8 in the closing direction when the barrier blade 7 performs a closing operation.

At the same time, the retaining portion 8h, which is bent in a V-shape, stops the sway of the barrier blade 7. Since the retaining portion 8h is opened in a V-shape, the barrier blade 7 surely catches the sliding portion 7g serving as the closing driving portion, so that no deviation occurs. The rear end of the blade portion 8e is provided with an opening coupling portion 8i of the barrier blade 8. The opening coupling portion 8i is bent at a right angle from the blade portion 8e, and the operation range thereof does not overlap the photographic lens 4 as viewed on the projection plane.

When the barrier blade 7 is opened, the opening driving portion 7h drives the barrier blade 8 in the opening direction by pushing the opening coupling portion 8i of the barrier blade 8. A retaining stopper 8j, which prevents the flap of the barrier blade 8, protrudes from the support portion 8c of the barrier blade 8, and a sliding portion 8f is provided to maintain a gap with respect to the barrier cover 10.

Here, referring back to FIG. 1, the phase of the barrier driving member 5 when the barrier blade 7 is opened to enter the shooting-ready state is referred to as a 'barrier opening phase'. Further, the phase of the barrier driving member 5 when the lens tube 3 is retracted to close the barrier blade 7 is referred to as a 'barrier closing phase'.

Since the barrier driving member 5 and the rectilinear motion tube 2 are respectively provided with the cam surfaces 2a and 5a, when the lens tube 3 is retracted, the cam surface 2a and the cam surface 5a come into contact with each other, and the barrier driving member 5 is forcedly rotated in the direction depicted by the arrow A while charging the barrier drive spring 6. When the barrier driving member 5 rotates up to the 'barrier closing phase', the barrier blades 7 and 8 are closed.

When the lens tube 3 is moved forward, the cam surfaces 2a and the cam surface 5a, which have been in contact with each other, are separated, and the barrier driving member 5 rotates in the direction depicted by the arrow B while releasing the charging of the barrier drive spring 6. When the barrier driving member 5 rotates up to the 'barrier opening phase', the barrier blades 7 and 8 are opened.

The barrier driving member 5 is provided with the spring hanger 5d, which extends in the radial direction. Since the arm of the spring hanger 5d extends in the radial direction, the position of the barrier driving member 5 in the optical axis direction can be stably controlled. One end of the barrier drive spring 6 is put on the spring hanger 5d.

Next, referring to FIGS. 1 and 2 to 5, the operation of the barrier and the charge amount of the barrier drive spring 6 will be described. Further, in FIGS. 2 to 4, it is assumed that the barrier blade 8 is removed to specifically describe the present exemplary embodiment.

FIG. 2 is a front view illustrating a state where the barrier is fully closed when the lens tube 3 is in the retracted state.

In FIG. 2, the barrier blade 7 is biased in the direction depicted by the arrow C by the tension of the barrier drive spring 6. In the retracted state, the barrier blade 7 is maintained in the closed state by the biasing force of the barrier drive spring 6.

Further, the barrier driving member 5 is biased in the rotation direction depicted by the arrow B illustrated in FIG. 1 by the tension of the barrier drive spring 6. In the retracted state, the rotation in the direction depicted by the arrow B is regulated by the action of the cam surface 2a formed in the rectilinear motion tube 2. At this time, the charge amount of the barrier drive spring 6 becomes a value at a fully closed state illustrated in FIG. 5.

FIG. 3 is a front view illustrating a state where the lens tube 3 is slightly moved forward so that the barrier blade 7 starts to be opened. In this state, since the barrier driving member 5 and the rectilinear motion tube 2 relatively move compared to the retracted state, the barrier driving member 5 slightly rotates in the direction depicted by the arrow B in FIG. 1 by the cam surface 2a of the rectilinear motion tube 2, and comes into contact with the barrier blade 7 at the contact portion 5b. At this time, the charge amount of the barrier drive spring 6 reduces compared to the fully closed state illustrated in FIG. 5.

FIG. 4 is a front view illustrating a state where the lens tube 3 is further moved forward so that the barrier blade 7 is fully opened. In this state, the cam surface 5a of the barrier driving member 5 is completely separated from the cam surface 2a of the rectilinear motion tube 2. For this reason, the barrier driving member 5 further rotates in the direction depicted by the arrow B, so that the barrier driving member 5 enters into the 'barrier opening phase' and the charge amount of the barrier drive spring 6 becomes a value at the fully opened state illustrated in FIG. 5.

Although the barrier blade 7 is pushed in the opening direction at the contact portion 5a of the barrier driving member 5, the front end of the barrier blade 7 comes into contact with the stopper 3b provided in the lens tube 3, so that the rotation of the barrier blade 7 in the opening direction is restricted.

Here, another spring hanging method will be described with reference to FIG. 7.

Figure 7:
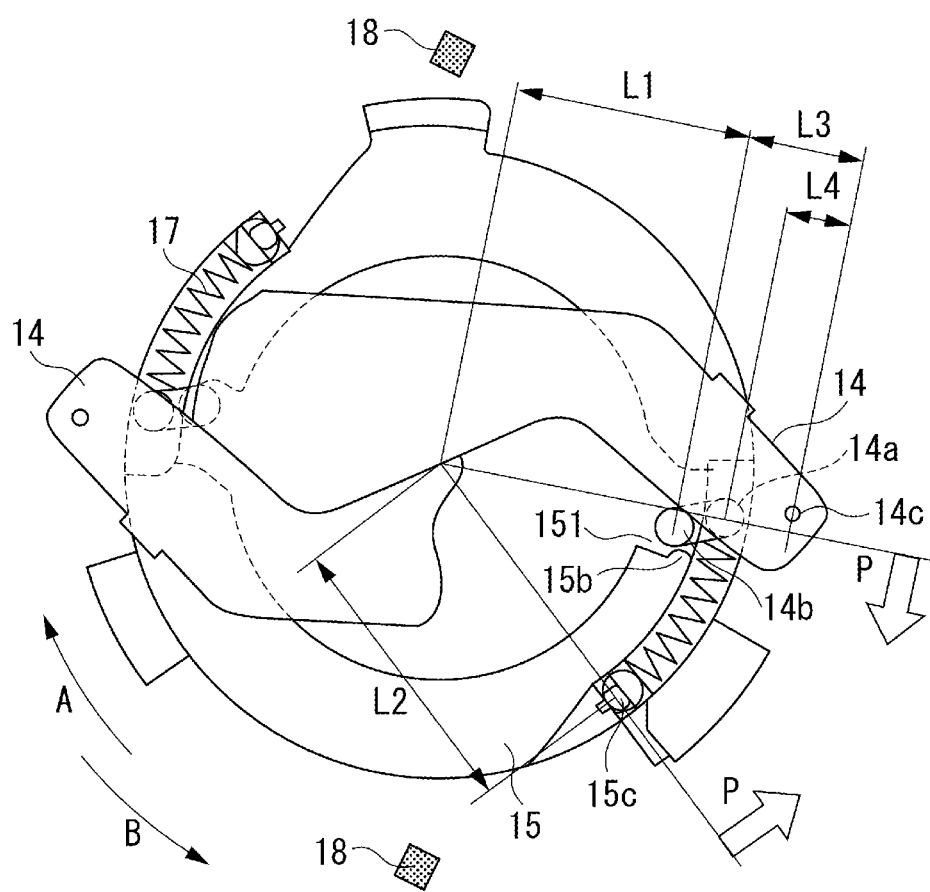
FIG. 7 is a diagram illustrating another spring hanging method.

As illustrated in FIG. 7, a rotation shaft 14c of the barrier blade 14 and a hook 14b for the barrier drive spring 6 provided in the barrier blade 14 have a distance L4 in the radial direction. For this reason, a rotational force is exerted on the barrier blade 14 around the rotation shaft 14c, but the diameter of the lens barrel increases by the distance L4 provided in the radial direction. Further, when the distance L4 is made to be short to decrease the diameter of the lens barrel, it is difficult to efficiently apply the rotational force to the barrier blade 14.

Therefore, an inflection point 6a may be provided in the barrier drive spring 6, so that the force of the barrier drive spring 6 is forcedly made to be exerted in the direction depicted by the arrow C in FIGS. 2 to 4. The shape in which the barrier drive spring 6 has the inflection point 6a is provided in the barrier driving member 5, but any place and any component may be used as long as the barrier drive spring 6 may have the inflection point 6a.

Further, as a method of providing the inflection point 6a to the barrier drive spring 6, the barrier driving member 5 is provided with a semi-circular protrusion 5c. However, any method and any shape may be used as long as the barrier drive spring 6 may have the inflection point 6a.

Here, the barrier drive spring 6 normally comes into contact with the protrusion 5c, which is provided in the barrier driving member 5, during the opening and closing operation of the barrier blade 7. For this reason, since the force of the barrier drive spring 6 may be efficiently directed to the direction depicted by the arrow C regardless of the opening and closing operation of the barrier blade 7, the opening and closing operation of the barrier blade 7 may be stabilized. Further, since the force may be efficiently exerted in the direction depicted by the arrow C even when the distance is not present between the rotation shaft 3a and the hook 7a in the radial direction, the diameter of the lens barrel can be shortened and the size of the lens barrel can be decreased.

Figure 8A:
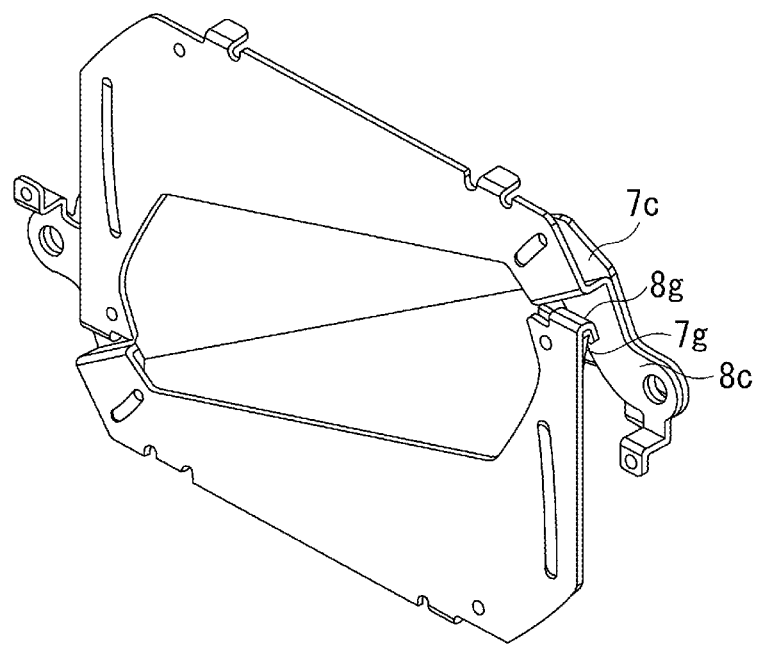
FIGS. 8A, 8B, and 8C are specific diagrams illustrating the motion of the barrier blade.

Next, referring to FIGS. 8A, 8B and 8C, the motion of the blade of the barrier will be described. FIG. 8A is a diagram illustrating a state where the barrier is closed, FIG. 8B is a diagram illustrating a state where the barrier starts to be opened, and FIG. 8C is a diagram illustrating a state where the barrier is opened.

In FIG. 8A, in which the barrier is closed, the sliding portion 7g serving as the closing driving portion pushes the closing coupling portion 8g so that the barrier blades 7 and 8 are both located at the closed positions. Then, the closing coupling portion 8g, which is bent downward from the blade portion 8e, and the retaining portion 8h are located on the support portions 7c and 8c of the other paired barrier blades 7 and 8.

Figure 11:
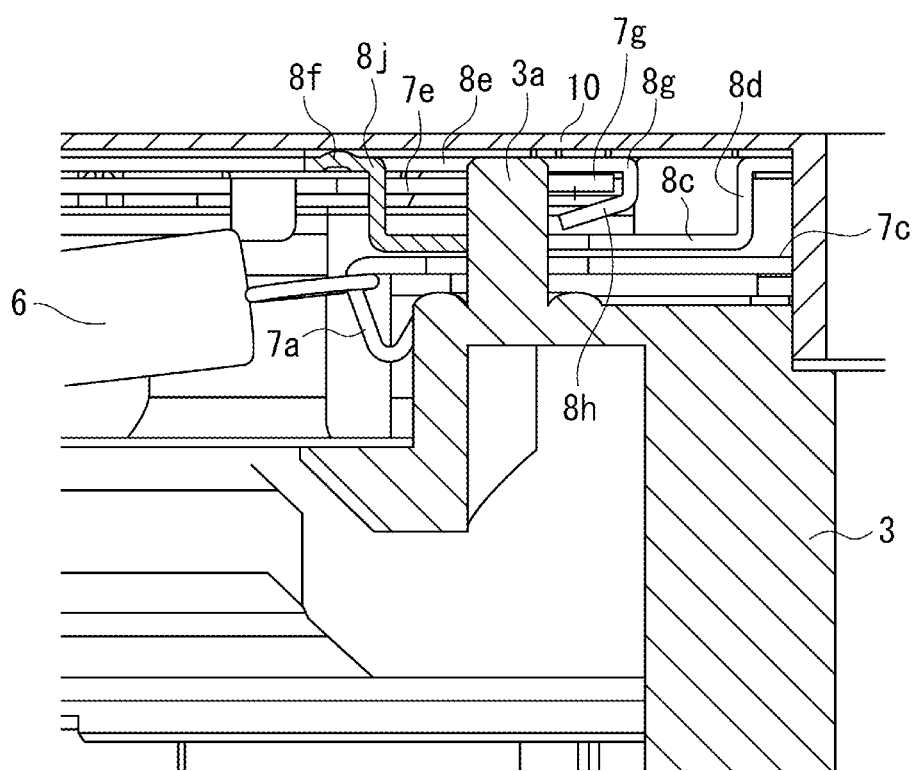
FIG. 11 is an enlarged cross-sectional view illustrating a front end portion and a center portion of a barrier mechanism.

The downward bent portion is disposed at a position which is away from the photographic lens 4 and is above the opposite side. Accordingly, the coupling portion may be sufficiently caught, and the thin thickness of the barrier and the small diameter of the lens barrel may be helpfully maintained. FIG. 11 is an enlarged diagram illustrating the sliding portion 7g serving as the closing driving portion, the coupling portion 8g, the retaining portion 8h, and the support portions 7c and 8c of the opposite barrier blades 7 and 8.

Figure 8B:
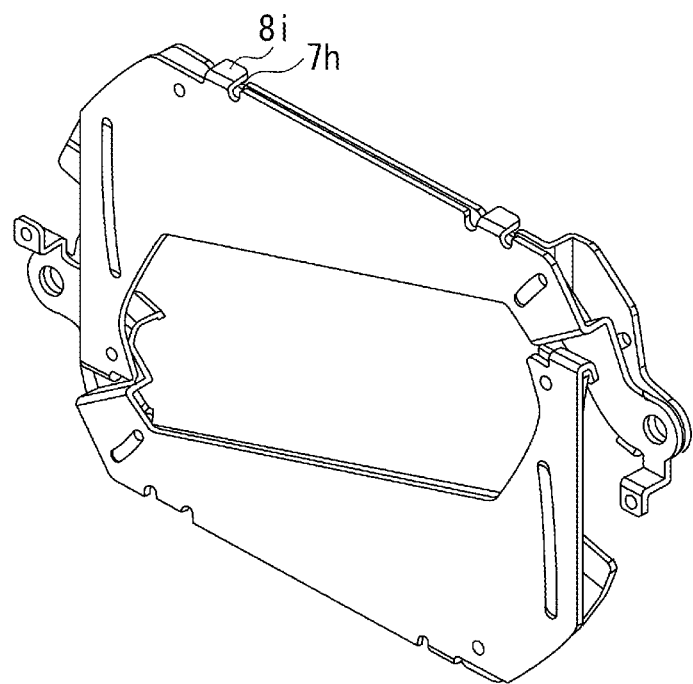
Figure 8C:
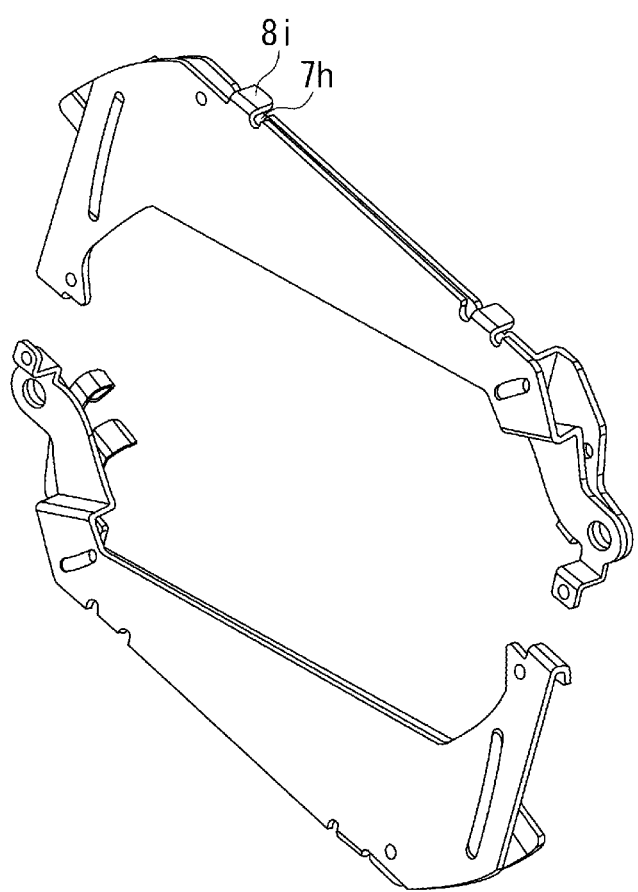

In FIG. 8B, in which the barrier starts to be opened, the barrier blade 7 moves halfway in the opening direction. On the other hand, the barrier blade 8 does not move yet.

The timing illustrated in FIG. 8B indicates the timing at which the opening driving portion 7h of the barrier blade 7 is surely about to push the opening coupling portion 8i of the barrier blade 8. Since the opening coupling portion 8i of the barrier blade 8 is located outside the photographic lens 4 as viewed on the projection plane, the downward bent amount of the opening coupling portion 8i is sufficiently obtained, and an accident does not happen in which the driving portion 7h and the opening coupling portion 8i deviate from each other so that the opening force is not transmitted.

In FIG. 8C, in which the barrier is fully opened, the barrier blade 7 and the barrier blade 8 are also located at the opened position. Then, the opening driving portion 7h of the barrier blade 7 pushes the opening coupling portion 8i of the barrier blade 8, so that the rotation of the barrier blade 7 is restricted by the stopper 3b (FIG. 4) via the opening coupling portion 8i of the barrier blade 8.

With such a configuration, the barrier blade 7 can be prevented from getting into the gap between the barrier cover 10 and the stopper 3b, which are coupled by the barrier cover fixing member 9.

In this way, the barrier blade 8 is provided with an upward bent portion which is bent toward the lens (the direction toward the imaging plane) along the optical axis direction, the upward bent portion is made so as not to enter the range overlapping the front lens surface as viewed on the projection plane, and the barrier blade 7 is provided with the closing coupling portion 8g, which pushes the barrier blade 8 in the closing direction, thereby thinning the barrier.

In addition, the support portion 7c and the sliding portion 7g, serving as the closing driving portion, and the support portion 8c and the closing coupling portion 8g of the pair of blades are made to overlap as viewed on the projection plane while the support portion 7c and the support portion 8c are lowered in a step shape, thus reducing the thickness of the barrier and reducing the diameter of the lens barrel.

Since two upward bent portions of the opening coupling portion 8i and the closing coupling portion 8g with the retaining portion 8h are directed toward the photographic lens 4 in the optical axis direction, there is no need to form an escape portion for the upward bent portion even in the barrier cover 10, which forms the opening of the foremost end of the lens barrel and covers the blade. For this reason, since the barrier cover 10 can be formed by performing a drawing process on a metallic sheet, a thin barrier can be formed.

Figure 9:
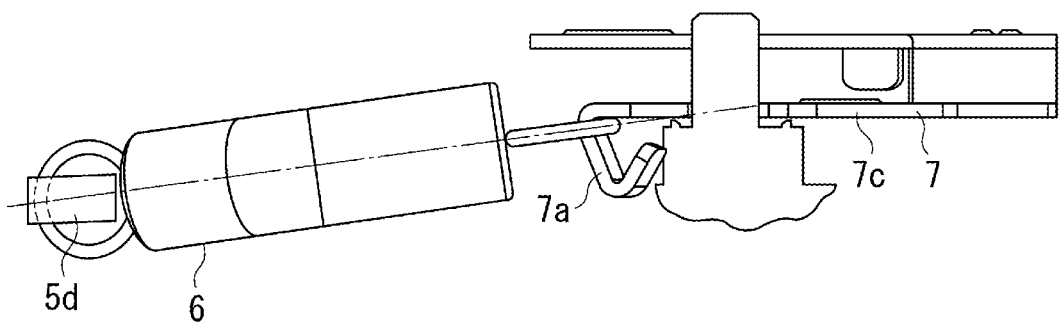
FIG. 9 is a diagram illustrating a retaining stopper for the barrier blade.

FIG. 9 is a diagram illustrating a retaining stopper for the barrier blade.

The barrier blade 7 is rotatably attached by inserting the rotation shaft 3a provided in the lens tube 3 into the rotation hole 7b. Then, the barrier drive spring 6 is hung between the hook 7a, which is bent from the support portion 7c of the barrier blade 7, and the spring hanger 5d, which extends from the barrier driving member 5 in the radial direction. When the barrier is closed, the barrier drive spring 6 enters into a charged state in which the barrier drive spring 6 extends at a maximum. Thus, the barrier drive spring 6 applies a rotational force to the barrier blade 7 around the line which connects the rotation hole 7b of the barrier blade 7 and the front end of the blade serving as one stopper.

The line connecting the rotation hole 7b of the barrier blade 7 and the front end of the blade is inclined. However, since the position of the hook 7a is close to the rotation hole 7b and is distant from the front end of the blade, the right end of the rotation hole 7b is substantially pulled. If the flap is not regulated, the spring hanger 5d, the hook 7a, and the rotation hole 7b are apt to flap so as to be disposed at the straight line. Since the hook 7a is bent at an acute angle larger than the right angle, the attachment portion of the barrier drive spring 6 tightly and stably contacts the rear surface of the support portion 7c. Thus, when the spring hanger 5d, which extends from the barrier driving member 5 in the radial direction, is made to be located at a position lower than the hook 7a, the spring hanger 5d, the hook 7a, and the rotation hole 7b can be disposed on the straight line, so that the flap in the pitch direction with respect to the force direction is not caused by the force of the barrier drive spring 6.

The flap in the roll direction with respect to the force direction caused by the force of the barrier drive spring 6 is stopped or reduced in such a manner that the sliding portion 7g, serving as the closing driving portion of the front end of the blade, is regulated by the closing coupling portion 8g and the retaining portion 8h of the barrier blade 8.

In this way, although the barrier blade constituting the barrier may be easily flapped by the portion covering the lens and the rotation shaft portion located at the side of the lens and outside the lens, which are bent in a crank shape, the flap of the barrier blade can be handled by the following countermeasure. That is, in order to prevent the flap in the pitch direction with respect to the direction of the force of the spring exerted in the direction in which the barrier is closed, the rotation shaft of the blade, the spring hanging position, and the position of the spring hanger of the barrier driving member of another spring hanger are formed on the straight line. Further, in order to prevent the flap in the roll direction with respect to the direction of the force of the spring exerted in the direction in which the barrier is closed, the retaining portion 8h of the barrier blade 8 is constrained by the closing coupling portion 8g and the retaining portion 8h located at the front end of the barrier blade 8.

FIGS. 10A, 10B, 10C, 10D, and 10E are diagrams illustrating three barrier blades, in which there is no difference except for the configuration of the blade. Accordingly, the shape of the blade will be described.

Figure 10A:
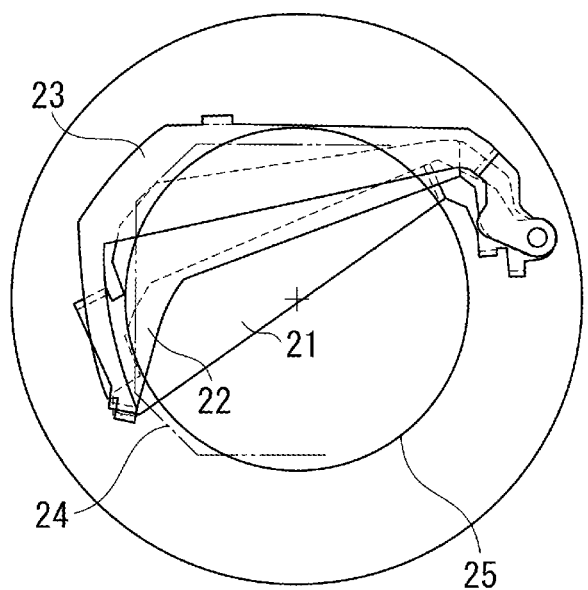
FIGS. 10A, 10B, 10C, 10D, and 10E are diagrams illustrating three-sheet barrier blades.
Figure 10B:
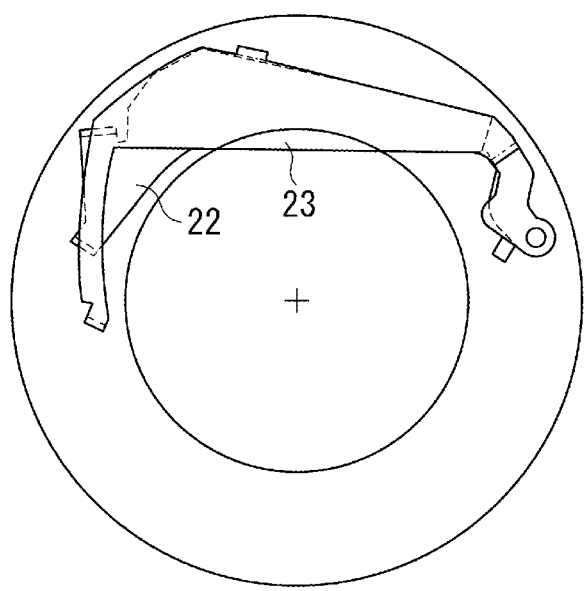
Figure 10C:
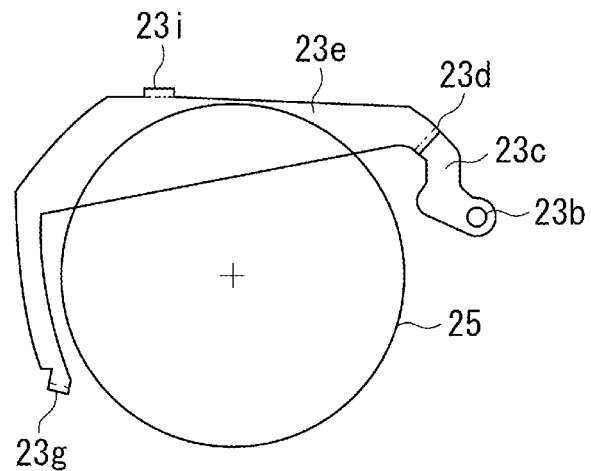

FIG. 10A is a diagram illustrating a state where the barrier including three barrier blades is closed. In the order from the bottom, a barrier blade 21, a barrier blade 22, and a barrier blade 23 are located. The two-dotted chain line indicates a part 24 of the opening of the barrier cover. The outer shape of the photographic lens 4 is indicated with a circle 25. FIG. 10B is a diagram in which the barrier blades overlap when the barrier is opened. The lowermost barrier blade 21 is not visible. FIG. 10C illustrates the barrier blade 23, which is formed of a thin metallic sheet. The barrier blade 23 is provided with a rotation hole 23b, a support portion 23c as a rotation center, a step portion 23d, a blade portion 23e, a closing coupling portion 23g, and an opening coupling portion 23i. Although the description is not repeated since the description is the same as that of the barrier blade 8, the closing coupling portion 23g and the opening coupling portion 23i are upward bent portions which are bent toward the photographic lens 4 and are located outside the outer shape 25 of the photographic lens 4.

Figure 10D:
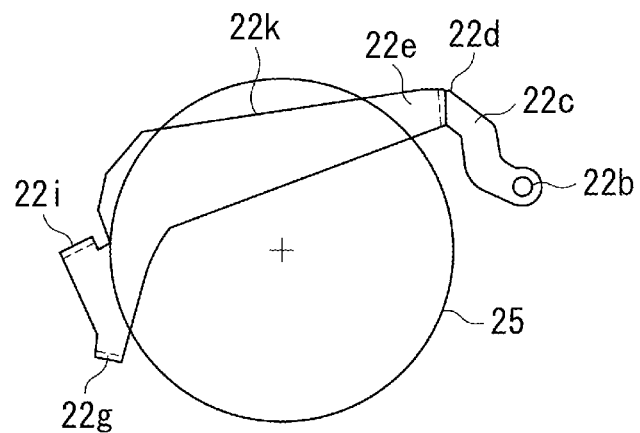

FIG. 10D illustrates the barrier blade 22, which is formed of a thin metallic sheet. The barrier blade 22 is provided with a rotation hole 22b, a support portion 22c, a step portion 22d, a blade portion 22e, a closing coupling portion 22g, and an opening coupling portion 22i.

Although the description is not repeated since the description is the same as that of the barrier blade 8, the closing coupling portion 22g and the opening coupling portion 22i are upward bent portions which are bent toward the photographic lens 4 and are located outside the outer shape 25 of the photographic lens 4. When the barrier is closed, the closing coupling portion 22g pushes the closing coupling portion 23g of the barrier blade 23 in the direction to close the barrier blade 23. Since the opening coupling portion 22i comes into contact with the photographic lens 4 at the rear side of the blade, the opening coupling portion 22i moves to the opposite side of the photographic lens 4 as seen from the rotation hole 22b.

Although not illustrated, a retaining portion is provided to the closing coupling portion 22g, and the opening driving portion 22k is formed with the rear end surface of the blade. When the barrier is opened, the opening driving portion 22k pushes the opening coupling portion 23i of the barrier blade 23 in the direction to open the barrier blade 23.

Figure 10E:
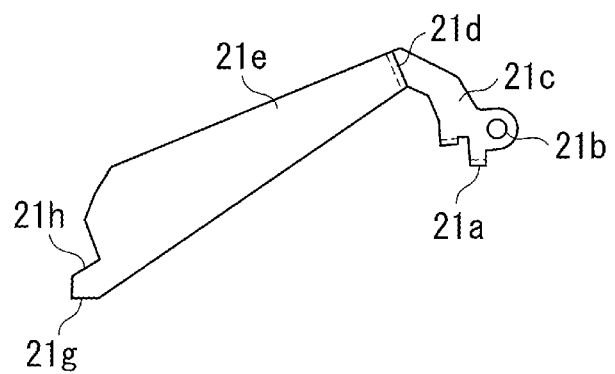

FIG. 10E illustrates the barrier blade 21, which is formed of a thin metallic sheet. As in the barrier blade 7, the barrier blade 21 is provided with a hook 21a, a rotation hole 21b, a support portion 21c, a step portion 21d, a blade portion 21e, a closing driving portion 21g, and an opening driving portion 21h, in which any sliding portions are not illustrated as well as in the other barrier blades 22 and 23.

When the barrier is closed, the closing driving portion 21g pushes the closing coupling portion 22g of the barrier blade 22 in the direction to close the barrier blade 22. When the barrier is opened, the opening driving portion 21h pushes the opening coupling portion 22i of the barrier blade 22 in the direction to open the barrier blade 22.

As described above, even when six blades are provided in total while one side has three blades, a blade located in front of the lens is formed of a thin metallic sheet. Then, the transmission of the rotation operation is performed by the end surface of the lower barrier blade and the downward bent portion which is bent toward the lens from the upper barrier blade provided in the outer periphery of the photographic lens 4 in such a way as not to overlap the photographic lens 4 as viewed on the projection plane. Furthermore, a step is formed in the rotation shaft portion so that the downward bent portion for the closing operation overlaps the rotation center of the barrier blade as viewed on the projection plane.

In this way, according to an exemplary embodiment of the invention, a plurality of barrier blades overlapping each other is interlocked with each other at the downward bent portion of a barrier blade which is bent toward the imaging plane and a locking portion formed by using the thickness of the blade, thereby decreasing the thickness of the barrier. Then, since the downward bent portion is formed in such a way as not to overlap a photographic lens covered by the barrier as viewed on the projection plane, all the barrier blades can be formed of a thin metallic sheet, so that a barrier mechanism which is thin in the optical axis direction can be formed. Furthermore, since the downward bent portion overlaps the rotation center of the barrier blade as viewed on the projection plane, the diameter of the lens barrel can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-007051 filed Jan. 17, 2011, which is hereby incorporated by reference herein in its entirety.

What is claimed is:

1. A lens barrel comprising:
a lens tube configured to hold a lens;
a barrier driving member configured to move between an opened state and a closed state by switching of the lens tube between a shooting-ready state and a retracted state;
a pair of first barrier blades, each of which includes a blade portion, configured to open and close in conjunction with the barrier driving member;
a pair of second barrier blades, each of which includes a blade portion and a coupling portion, the coupling portion positioned outside the lens as viewed from an object side and located closer to the first barrier blade than the blade portion, the pair of second barrier blades being configured to be moved by contact between the coupling portion and the first barrier blade, and
wherein the second barrier blade further includes a closing coupling portion that is a downward bent portion for transmitting a motion from an end surface of the first barrier blade to the second barrier blade, the closing coupling portion being folded back by an angle equal to or greater than 90° and less than 180°, and when the second barrier blade is at a closed position, the closing coupling portion prevents a front end of the first barrier blade from swaying in an optical axis direction.

2. The lens barrel according to claim 1, wherein the blade portion is positioned at the object side with respect to the lens, and the coupling portion is located at a position overlapping the lens in an optical axis direction.

3. The lens barrel according to claim 1, wherein the pair of first barrier blades and the pair of second barrier blades are each formed from a metallic sheet.

4. The lens barrel according to claim 1, wherein the barrier driving member and each barrier blade move between an opened state and a closed state by using a barrier drive spring configured to pull the barrier driving member in an opening direction and to pull each barrier blade in a closing direction.

5. The lens barrel according to claim 1, wherein the barrier driving member and each barrier blade move between an opened state and a closed state by using an opening driving spring configured to pull the barrier driving member in an opening direction and a closing driving spring configured to pull each barrier blade in a closing direction.

6. The lens barrel according to claim 1, further comprising a barrier cover formed by performing a drawing process on a metallic sheet.

7. The lens barrel according to claim 1, wherein the lens tube includes a pair of shafts, rotation holes are provided in rotation centers of the first barrier blade and the second barrier blade and the shafts are inserted into the rotation holes so that the first barrier blade and the second barrier blade are rotatable.

8. A camera comprising the lens barrel according to claim 1.

9. A lens barrel comprising:
a lens tube configured to hold a lens;
a barrier driving member configured to move between an opened state and a closed state by switching of the lens tube between a shooting-ready state and a retracted state;
a pair of first barrier blades, each of which includes a blade portion, configured to open and close in conjunction with the barrier driving member;
a pair of second barrier blades, each of which includes a blade portion and a coupling portion, the coupling portion positioned outside the lens as viewed from an object side and located closer to the first barrier blade than the blade portion, the pair of second barrier blades being configured to be moved by contact between the coupling portion and the first barrier blade;
a third barrier blade, wherein the third barrier blade includes a closing coupling portion and an opening coupling portion that are downward bent portions for transmitting a motion from an end surface and a closing coupling portion of the second barrier blade to the third barrier blade;
wherein the third barrier blade further includes a support portion and a blade portion between which a step is formed, and
wherein when the first barrier blade, the second barrier blade and the third barrier blade are closed, each coupling portion overlaps the step of each corresponding support portion of the first barrier blade, the second barrier blade and the third barrier blade.

10. The lens barrel according to claim 9, wherein the blade portion is positioned at the object side with respect to the lens, and the coupling portion is located at a position overlapping the lens in an optical axis direction.

11. The lens barrel according to claim 9, wherein the pair of first barrier blades and the pair of second barrier blades are each formed from a metallic sheet.

12. The lens barrel according to claim 9, wherein the barrier driving member and each barrier blade move between an opened state and a closed state by using a barrier drive spring configured to pull the barrier driving member in an opening direction and to pull each barrier blade in a closing direction.

13. The lens barrel according to claim 9, wherein the barrier driving member and each barrier blade move between an opened state and a closed state by using an opening driving spring configured to pull the barrier driving member in an opening direction and a closing driving spring configured to pull each barrier blade in a closing direction.

14. The lens barrel according to claim 9, further comprising a barrier cover formed by performing a drawing process on a metallic sheet.

15. The lens barrel according to claim 9, wherein the lens tube includes a pair of shafts, rotation holes are provided in rotation centers of the first barrier blade and the second barrier blade and the shafts are inserted into the rotation holes so that the first barrier blade and the second barrier blade are rotatable.

16. A camera comprising the lens barrel according to claim 9.

\* \* \* \* \*